United States Patent [19]

Pexa

[11] 3,921,073

[45] Nov. 18, 1975

[54] ARRANGEMENT FOR CARRIER RECOVERY IN CARRIER FREQUENCY VIDEO AND DATA TRANSMISSION SYSTEMS

[75] Inventor: Guenther Pexa, Munich, Germany

[73] Assignee: Siemens Aktiengesellschaft, Berlin & Munich, Germany

[22] Filed: Apr. 23, 1973

[21] Appl. No.: 353,907

[30] Foreign Application Priority Data

May 4, 1972 Germany ........................ 2221892

[52] U.S. Cl. .................... 325/50; 325/49; 325/329; 325/330; 325/331

[51] Int. Cl.$^2$ .......................................... H04B 13/00

[58] Field of Search ................ 325/49, 50, 329–331, 325/444; 178/7.3 R

[56] References Cited

UNITED STATES PATENTS

| | | | |
|---|---|---|---|
| 2,907,831 | 10/1959 | DeJager et al. | 325/50 |
| 3,147,437 | 9/1964 | Crafts et al. | 325/49 |
| 3,849,730 | 11/1974 | Yu-shang Ho | 325/329 |
| 3,872,381 | 3/1975 | Yamamoto et al. | 325/42 |

*Primary Examiner*—Albert J. Mayer
*Assistant Examiner*—Marc E. Bookbinder
*Attorney, Agent, or Firm*—Hill, Gross, Simpson, Van Santen, Steadman, Chiara & Simpson

[57] ABSTRACT

An arrangement for carrier recovery in carrier frequency video and data transmission systems comprising transmitting and receiving converters which operate with over modulation has a suppressed carrier modulator in the transmitting converter with a Nyquist filter connected to its output for creating a vestigial side band and a pre-emphasis circuit connected at the input for strongly damping low frequency signals so that a degree of modulation of less than 100% results in carrier frequency signals. The receiving converter includes a carrier recovery device having a band pass filter followed by a limiter. The limiter is connected to a demodulator and a de-emphasis circuit is connected to the output of the demodulator.

5 Claims, 7 Drawing Figures

ARRANGEMENT FOR CARRIER RECOVERY IN CARRIER FREQUENCY VIDEO AND DATA TRANSMISSION SYSTEMS

BACKGROUND OF THE INVENTION

1. Field of the Invention

This invention relates to an arrangement for carrier recovery in carrier frequency video and data transmission systems comprising transmitting and receiving converters which operate on an over modulation basis.

2. Description of the Prior Art

The carrier can be recovered from a double side band signal which has a modulation degree *m* which is less than 100% by limiting techniques, since in case of a pure double side band signal the zero transitions are identical with the zero transitions of the modulation carrier.

If vestigial side band transmission is utilized and the modulation degree *m* is less than 100%, the carrier can be recovered by filtering out the single side band signal formed by the Nyquist filter and by subsequent limiting. The band pass filter which is employed for this purpose has to be symmetrical on a linear frequency scale with respect to the carrier, since it would otherwise create a single side band portion itself which would cause a phase modulation of the recovered carrier.

SUMMARY OF THE INVENTION

It is therefore the object of the present invention to provide a circuit arrangement for performing carrier recovery in carrier frequency video and data transmission systems which operate with over modulation.

According to the invention, an arrangement for carrier recovery is designed and constructed in such a way that the transmitting converter contains a suppressed carrier modulator, which is connected by way of a hybrid circuit to a Nyquist filter for creation of a residual side band. The hybrid circuit is fed with a residual carrier, defined in phase and amplitude with respect to an input signal received via a pre-emphasis circuit connected to the input which pre-emphasis circuit is designed and constructed in such a manner that it strongly attenuates the low frequency signals so that at frequencies close to the carrier a degree of modulation of less than 100% will result. A de-emphasis circuit is included in the receiving converter which also contains a device for carrier recovery which includes a band pass filter.

Advantageously, the previously described method for carrier recovery can be maintained through the utilization of these measures, even in residual side band transmission and in over modulation for carrier recovery.

If the band pass filter is designed as an n-path filter, a symmetrical attenuation characteristic line which is symmetrical in the linear frequency scale referred to the carrier frequency will be achieved if the control frequency of the n-path filter is identical with the carrier frequency.

To raise the signal to noise ratio at low frequencies, a clamping circuit can be connected after the de-emphasis circuit.

If the pre-emphasis circuit is dimensioned in such a way that at no frequency does it have a higher attenuation than the interference voltage attenuation of the clamping circuit, the signal to noise ratio which is decreased by the pre-emphasis circuit can be completely balanced by the clamping circuit.

Furthermore, a phase control device can be provided in the carrier recovery device. The phase control device, on the one hand, rules out absolute phase errors and, on the other hand, can also rule out frequency modulation which may be caused, for example, by residual carrier component in the n-path filter.

BRIEF DESCRIPTION OF THE DRAWINGS

Other objects, features and advantages of the invention, its organization, construction and operation will be best understood from the following detailed description of a preferred embodiment of the invention taken in conjunction with the accompanying drawings, on which.

DESCRIPTION OF THE PREFERRED EMBODIMENT

Figure 1:
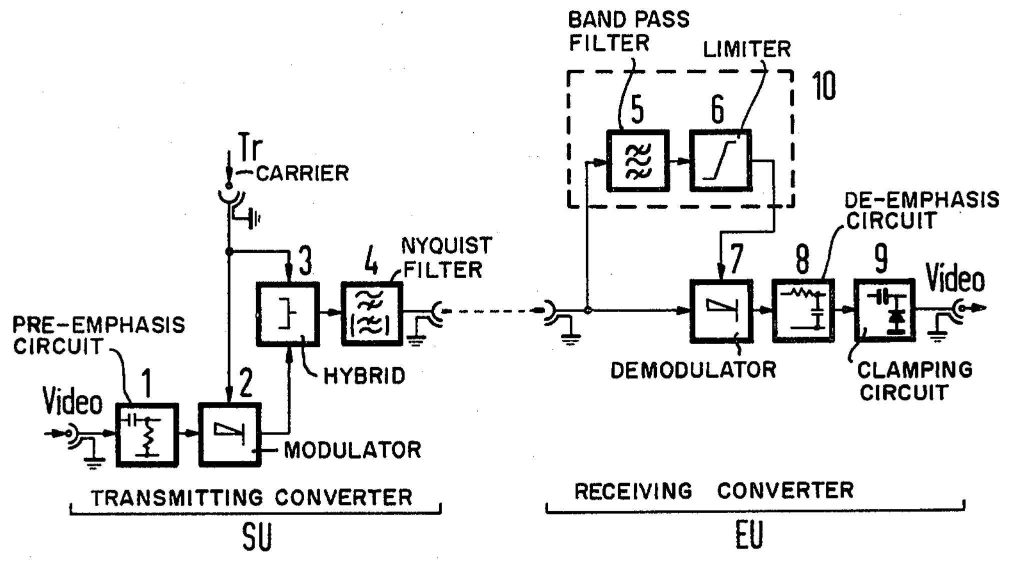
FIG. 1 is a schematic diagram of a primary circuit of the arrangement of the present invention.

Referring to FIG. 1, a principal circuit diagram of an arrangement according to the present invention is illustrated. In a transmitting converter SU, a video signal, for example, is applied by way of a pre-emphasis circuit 1 to a suppressed carrier modulator 2. In a hybrid circuit 3, a residual carrier component, defined in amplitude and phase position with respect to the modulation carrier, is added to the carrier frequency signal. A Nyquist filter 4 creates the residual side band. The carrier frequency signal is, possibly after further conversion, transmitted and arrives at a receiving station which includes a receiving converter EU. The receiving converter EU includes a demodulator 7 for receiving the transmitted signal and a carrier recovery circuit 10 for controlling the demodulation process of the demodulator 7. The carrier recovery circuit includes a band pass filter 5 connected to receive the transmitted signal and a limiter 6 connected between the band pass filter 5 and the demodulator 7. A de-emphasis circuit 8 is connected to the output of the demodulator circuit 7 to provide a correct frequency response and a following clamping circuit 9 insures a sufficient signal to noise ratio at low frequencies.

Figure 2:
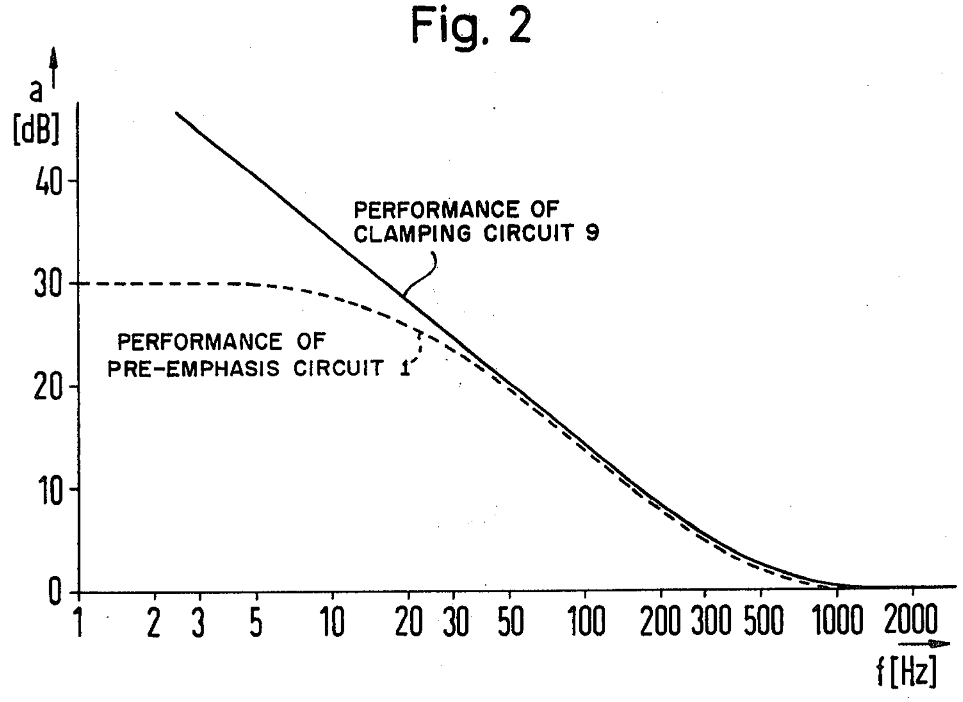
FIG. 2 is a graphic illustration of the damping of added interference voltages showing characteristic lines for clamping circuits and pre-emphasis circuits.

In FIG. 2, the damping of added interference voltages is graphically illustrated. The unbroken line illustrates the attenuation performance of the clamping circuit 9 and the broken line illustrates a preferred degree of attenuation of the pre-emphasis circuit 1. In FIG. 2 attenuation is marked in decibels (dB) with respect to the frequency in Hertz (Hz). If the pre-emphasis circuit 1 is dimensioned in such a way that at no frequency does it have a higher attenuation effect than the interference voltage attenuation of the clamping circuit 9, the signal to noise ratio which is decreased by pre-emphasis can be fully balanced by the clamping circuit.

Figure 3:
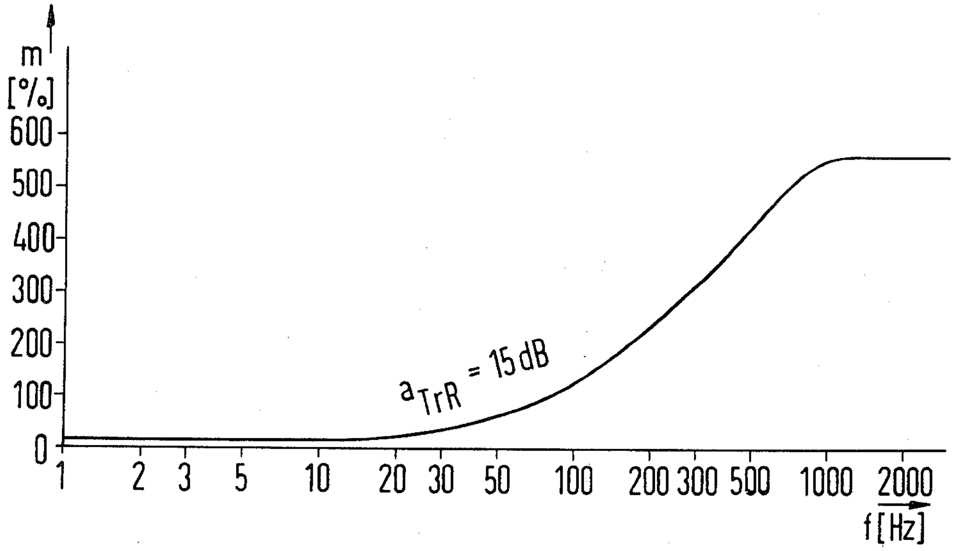
FIG. 3 is a graphic illustration of the degree of modulation.

If the residual carrier component $U_{trR}$ to the image blanking signal $U_{BA}$ of a video signal, for example $$a_{trR} = 20 \log \frac{U_{BA}}{2\sqrt{2}\,U_{TrR}} = 15\ db$$

the modulation degree illustrated in FIG. 3 will be obtained, which is dependent upon the video frequency.

In the case of low frequencies, the modulation degree is approximately 18% and increases to 100% at about 80 HZ. In the case of frequencies exceeding 1 kHz, the modulation degree is approximately 55%. If a video signal is fed with a 3 dB excess level ($a_{TrR}$= 18 dB), the degree of modulation will increase in the case of low frequencies up to about 25%.

The band pass filter in the carrier recovery circuit has the task of attenuation the side bands of the carrier frequency signal in such a way that the degree of modulation becomes smaller than 100% at higher video frequencies also. In addition, this circuitry has the task of suppressing the single side band signal which is formed by the Nyquist filter which, however, at frequencies close to the carrier is so small that oftentimes fulfillment of the first requirement causes fulfillment of the second requirement. In any case, the band pass filter must be symmetrical with respect to the carrier on a linear frequency scale.

Preferably, this can be achieved with an n-path filter. In the following, therefore, an embodiment with one n-path filter is described.

Figure 4:
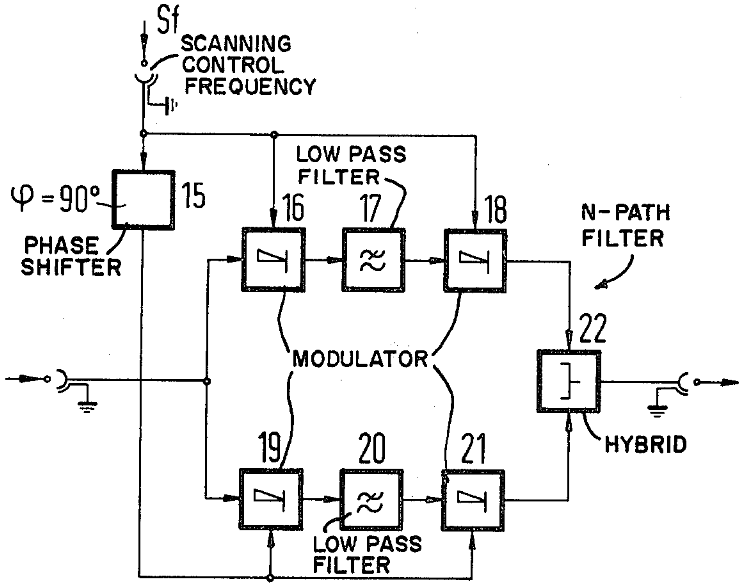
FIG. 4 is a schematic representation of an n-path filter.
Figure 5:
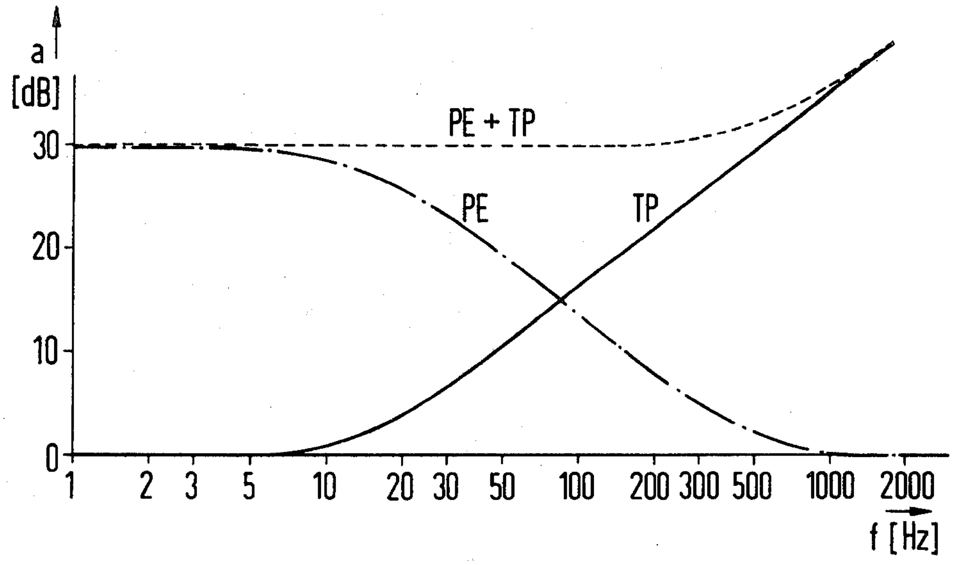
FIG. 5 is a graphic illustration of characteristic lines for pre-emphasis, low pass filtering in the n-path filter and total attenuation.
Figure 6:
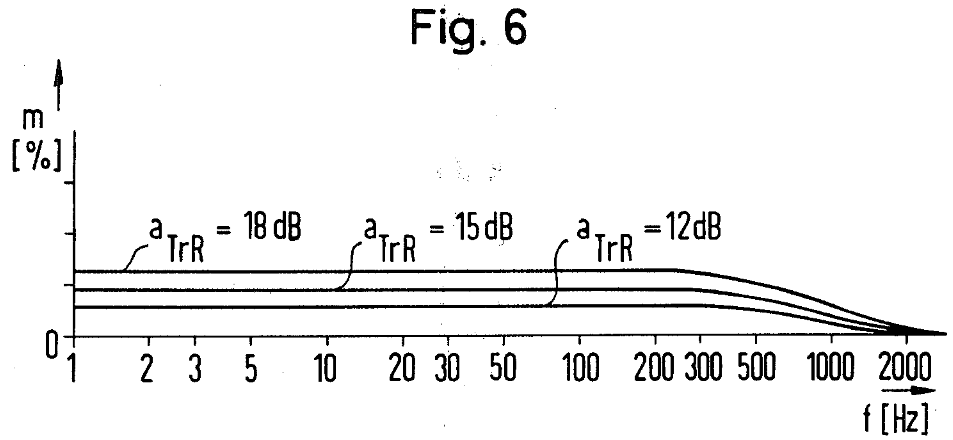
FIG. 6 is a graphic illustration of the modulation degree at the output of the n-path filter.

An n-path filter as is illustrated, for example, in FIG. 4 is a symmetrical band pass filter referred to the scanning control frequency Sf on a linear frequency scale. The n-path filter of FIG. 4 is illustrated as comprising a plurality of modulators 16, 18, 19 and 21 for receiving the scanning control frequency (modulators 16 and 18) or the scanning control frequency phase shifted by the phase shift circuit 15 (modulators 19 and 20). The modulators 16 and 18 have a low pass filter 17 interposed therebetween and the modulators 19 and 21 have a low pass filter 20 interposed therebetween. The modulators 18 and 21 are connected to a hybrid circuit 22. Of course, each of these circuits are per se well known in the art. If the low pass filters in the n-path filter are designed as simple RC low pass filters with a characteristic line TP as shown in FIG. 5, the total attenuation of pre-emphasis PE and low pass filtering TP (fully drawn curves) which is responsible for the modulation degree at the output of the n-path filter (FIG. 6) will be achieved, which is also illustrated in FIG. 5 by the evenly broken line.

With the assumption that the carrier frequency is identical with the control frequency of the n-path filter, a double side band signal will be received at the output of the n-path filter with a modulation degree which is less than 25% even in the case of a 3 dB excess level of the video signal. From this signal, the carrier is recovered by limiting, although phase errors may occur, for example such as long term errors, as well as such phase errors which are caused by the residual carrier and the other side band in the n-path filter. Since these phase errors only occur at low frequencies, they can be balanced by means of a phase control circuit. In FIG. 4, a phase shift circuit 15 is provided in combination with otherwise well known n-path filter components.

Figure 7:
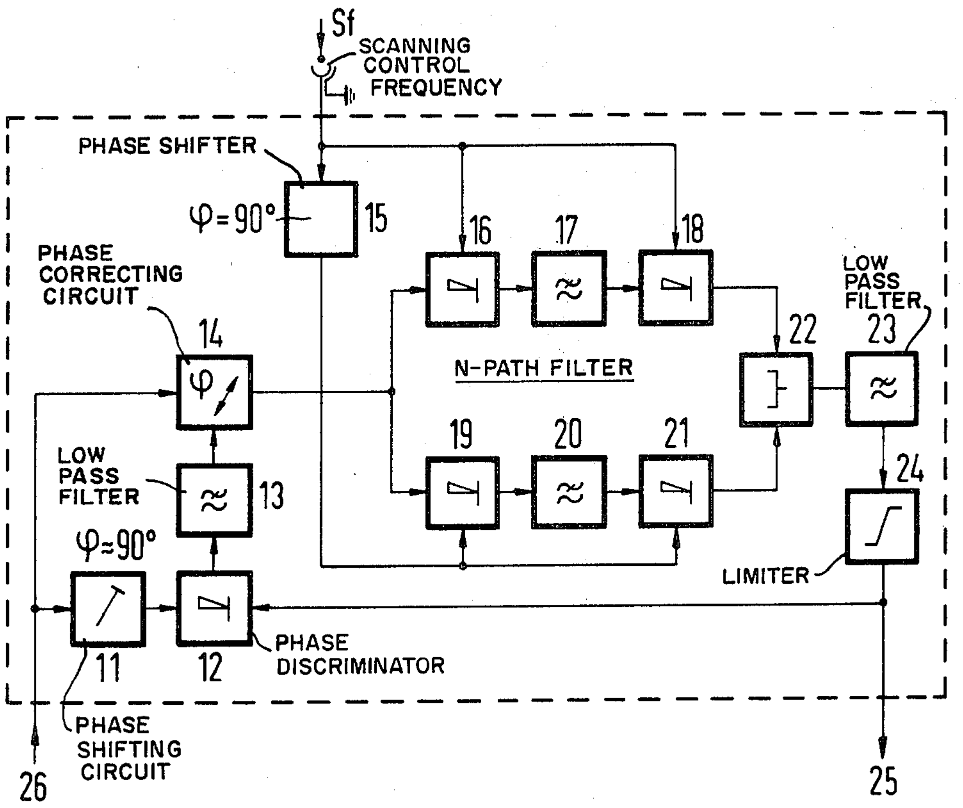
FIG. 7 is a schematic representation of an arrangement for carrier recovery with n-path filtering and phase control.

Referring to FIG. 7, carrier recovery using n-path filters and phase control is illustrated in greater detail. In the apparatus according to FIG. 7, the carrier frequency signal is adjusted by approximately 90°in phase in a phase shift circuit 11 and is applied to a phase discriminator 12 which is controlled by the carrier which also controls the demodulator. The phase discriminator 12 controls, by way of a low pass filter 13 (having characteristics corresponding approximately to that of FIG. 5) a phase correcting element 14 which, in turn, controls the phase in the signal path and supplies the n-path filter constituted by the elements 15–22 as set forth in FIG. 4. A low pass filter 23 is connected to the hybrid circuit 22 to filter out the higher modulation products of the n-path filter. A limiter 24 provides the demodulation carrier.

The method disclosed herein is applicable for all wide band signals (for example data signals) where at low frequencies a small signal to noise ratio is tolerable, or a clamping circuit can be utilized to improve the signal to noise ratio.

Although I have described my invention by reference to certain particular embodiments thereof, many changes and modifications of my invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An arrangement for carrier recovery in carrier frequency video and data vestigal side band transmission systems in which over modulation may occur at the transmitting end, comprising: transmitting and receiving converters, said transmitting converter including a source of carrier, a modulator connected to said source, a hybrid connected to said source and to the output of said modulator for providing a carrier and a modulated carrier, a Nyquist filter connected to said hybrid to provide a vestigal side band with a carrier for transmission, and a pre-emphasis circuit having an information signal input, said preemphasis circuit connected to the input of said modulator for attenuating low frequency signals to provide a level of modulation of less than 100% for frequencies in a frequency region in the vicinity of the carrier, said receiving converter including a demodulator having an input for receiving transmitted signals from said transmitting converter, a device having an input connected to the input of said demodulator for receiving signals transmitted from said transmitting converter to recover the carrier and an output connected to said demodulator to feed the recovered carrier thereto, said device including a bandpass filter connected to the input of said demodulator and a limiter connected to said bandpass filter and having an output connected to said demodulator, and a de-emphasis circuit connected to the output of said demodulator.

2. An arrangement according to claim 1 comprising a clamping circuit in said receiving converter coupled to the output of said de-emphasis circuit for improving the signal to noise ratio by attenuating interference signals.

3. An arrangement according to claim 2 wherein said pre-emphasis circuit includes means for causing a less attenuation of low frequency signals than the interference signal attenuation of said clamping circuit.

4. An arrangement according to claim 1, wherein said bandpass filter is an n-path filter and comprising a phase shift circuit in said carrier recovery device having an input for receiving a scanning frequency and an output connected to said n-path filter.

5. An arrangement according to claim 1, wherein said band pass filter is an n-path filter.

* * * * *